(Model.) 2 Sheets—Sheet 1.
J. WILLIAMS.
CHERRY PITTER.
No. 292,393. Patented Jan. 22, 1884.
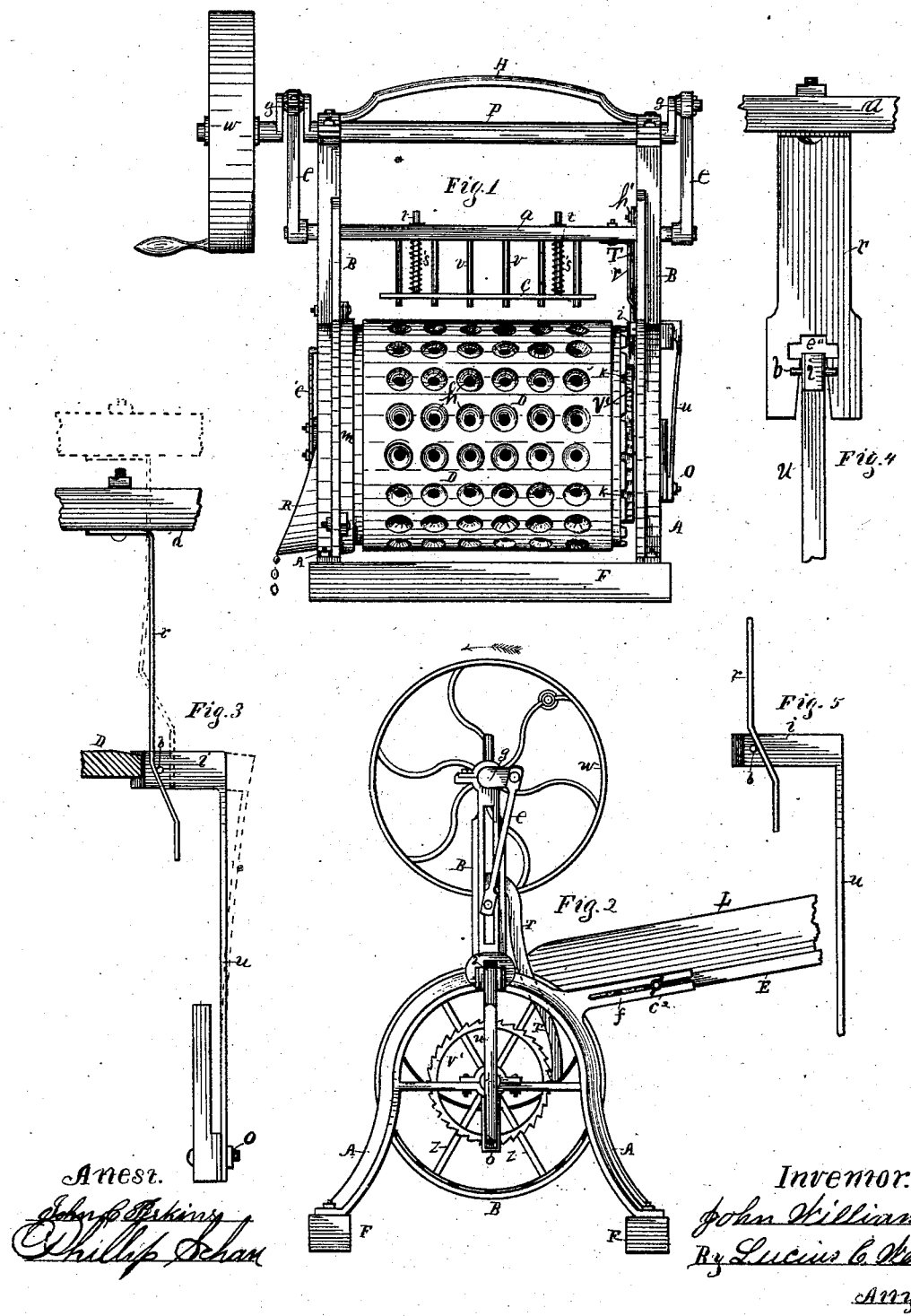
Attest.
John C. Perkins
Phillip Schau
Inventor.
John Williams
By Lucius C. West
Atty.

(Model.)
J. WILLIAMS.
CHERRY PITTER.
No. 292,393. Patented Jan. 22, 1884.
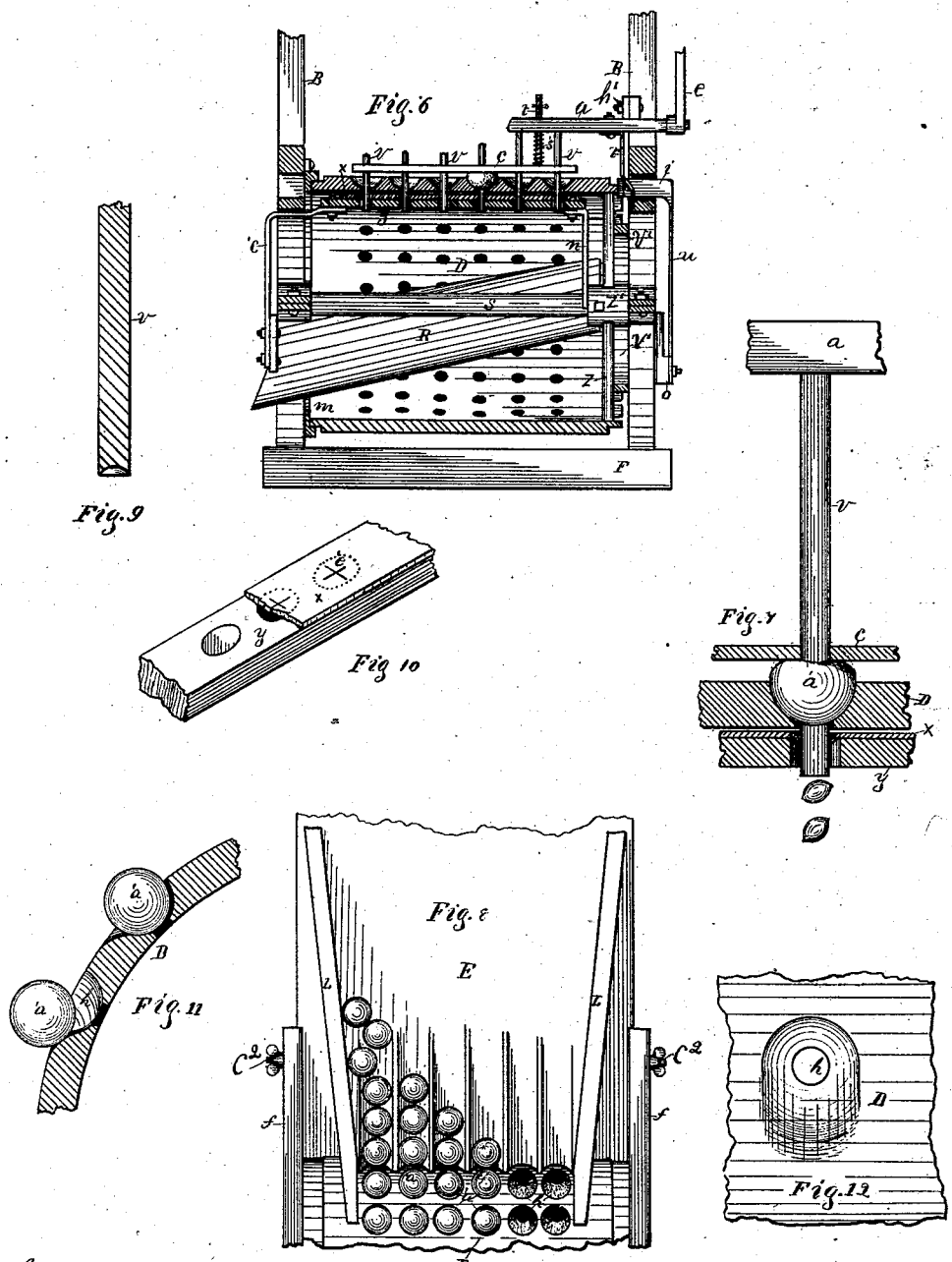

UNITED STATES PATENT OFFICE.

JOHN WILLIAMS, OF KALAMAZOO, MICHIGAN.

CHERRY-PITTER.

SPECIFICATION forming part of Letters Patent No. 292,592, dated January 22, 1884.

Application filed September 19, 1882. (Model.)

*To all whom it may concern:*

Be it known that I, JOHN WILLIAMS, a citizen of the United States, residing at Kalamazoo, county of Kalamazoo, State of Michigan, have invented a new and useful Machine for Pitting Cherries, of which the following is a specification.

My invention has for its object certain improvements in cherry-pitters which have a revoluble cylinder provided with fruit-pockets and a series of punches for forcing the pit out of the fruit in said pockets.

The novel features and their utility are set forth in the following description and pointed out in the claims.

In the drawings forming a part of this specification, Figure 1 is a rear elevation looking from a point at the left of Fig. 2; Fig 2, end view looking from a point at the right of Fig. 1. Figs. 3, 4, and 5 are detached parts of the operating mechanism hereinafter described; Fig. 6, a longitudinal section of the cylinder and other parts in Fig. 1; Fig. 7, detached portion of Fig. 6, showing the operation of the punch; Fig. 8, top view of the spout in Fig. 2, also showing a broken portion of the cylinder; Fig. 9, longitudinal section of a punch; Fig. 10, broken portion of the punch-cleaner in perspective; Fig. 11, portion of the cylinder in cross-section, showing the form of the fruit-pockets; and Fig. 12 is a top view of one of said pockets.

The supports B B, provided with legs A A, beams F F, and top connecting-bar, H, constitute the frame of the machine.

D is the revoluble cylinder, having fruit-pockets *h h*, which terminate in perforations through the shell of said cylinder. By referring to Fig. 11 and 12 an improvement in these pockets will be seen, which consists in chamfering away one side, or rather casting them in this form, which allows the fruit to more readily enter and fall out of said pockets. The cylinder D has an axle, S, with hub (Z') and spoke (Z) connections at one end, which revolubly support it, while the other end has no hub and spokes, but has bearings in a flanged disk, *m*. The object of this is to admit of the location within the cylinder of a spout, R, which extends out beyond the end of the cylinder, and also to admit of a support to the punch-cleaner extending from said end within said cylinder and not interfere with the revolving of it. In the end of the cylinder which is provided with spokes are formed notches *k k*, their use being hereinafter explained. A serrated wheel, *v'*, or ratchet, is secured to the spokes Z Z. A pawl, T, is pivoted to bar *a*, or a support connected with said bar, at *h'*. This ratchet-wheel and pawl revolve the cylinder D at stated intervals during the rise and fall of bar *a*.

*u* is a spring-pawl, the upper shouldered end, *i*, being adapted to enter notches *k k*, to hold the cylinder stationary at intervals corresponding to the action of the pawl T.

To the bar *a* the punches *r r* are secured.

In Fig. 9 a punch, *v*, is shown in section, illustrating the form of the lower end, the same being concave or dishing. This form better enables the punch to cut its way through the pit itself in case it was not exactly centrally located in a manner to be carried out whole.

The punches *v v* are provided with a presser-bar, *c*, for keeping the fruit from being lifted out of the pockets *h h* when said punches are raised during the operation. This presser-bar *c* has perforations, through which the punches are loosely located. It is supported a slight distance above the lower end of the punches by pintles *t t*, which play vertically through holes in bar *a*, and are provided at the upper ends with a key, which prevents their downward movement beyond the proper point, Fig. 1. The pintles or rods *t t* are provided with springs *s' s'*, which constantly press down on bar *c* with a yielding resistance against the upward pressure when in operation. The punch-supporting bar *a* is located in slots in supports B B, and is carried up and down therein by means of arms *e e*, pivoted to each end of said bar, and connecting with cranks *g g*, formed in the revoluble shaft P. *w* is a belt-wheel, to which power may be applied.

*r* is a spring-bar, having its upper end secured to bar *a*, and the lower end slotted in a manner to allow the end *i* of pawl *u*, with its studs *b b*, to play therein, as described in the operation, Fig. 4. Bar *r*, near the lower end, is bent at a right-oblique angle for a short distance, then terminates in a perpendicular, Figs. 3 and 5. This bar, styled the "unlocking spring-bar," throws the locking-pawl *i* out of notches *k k* at the proper time for the cylinder to move on its axis. This pawl and bar, being of spring metal, are always positive in their action and very simple in construction.

My device for cleaning the punches consists in a bar, $y$, having perforations in the right location to receive the punches $v$ $v$ in their downward movement, and is provided with a plate or strip of rubber, $x$. Cross-slits are made through the rubber into the perforation, as at $e'$, the slits terminating short of the boundary of said perforations, Fig. 10. Thus the slits readily admit the punches and form a close engagement therewith, clearing them of any adhering pit or substance, Fig. 7. The punch-cleaner is secured in place beneath the shell of the cylinder at the upper side, Fig. 6, by means of supports $e'$ and $n$, the former being bolted to the frame and the latter resting on axle $s$, or by other suitable means.

E is a fruit-spout, which may be connected with a supply-bin; or the fruit may be deposited in the rear open end of it. L L are the two sides of the trough. It is located on the opposite side of the cylinder from the direction it revolves (front side in Fig. 2) on an incline, in such a relation with the periphery of the cylinder D as to bring the fruit in contact with said cylinder at a point below the punches $v$ $v$, in order that as the cylinder revolves the fruit-pockets will be filled, and all surplus fruit not in the pockets which may be carried up toward the punches by the revolving of the cylinder will roll back down its side into the spout again. The spout E, if desired, may be made with the bottom corrugated, as in Fig. 8, next to the cylinder, to better guide the fruit in the pockets. Said spout may be detachably connected with the device by a set-screw, $e^2$, in a slot of bar, $f$, or by any practical means, Fig. 2.

In the operation, spout E may be filled with cherries $a'$ $a'$ to a depth of two or three tiers, more or less. As shaft P revolves, bar $a$, with punches $v$ $v$, is raised, Fig. 1, and the cylinder D revolved the distance the rows of pockets are apart, by means of pawl T, Fig. 2, which carries the pockets filled with cherries $a'$ $a'$ away from the fruit-supply toward the punches $v$ $v$. When bar $a$ rises, the unlocking-bar $r$ is also raised, the oblique portion engaging studs $b$ $b$, as in Fig. 3, which throws pawl $i$ out of notch $k$ prior to the movement of the cylinder D. As soon as bar $r$ is carried above studs $b$ $b$ the spring $u$ of pawl $i$ forces said pawl into the next notch $k$, which holds the cylinder stationary during the downward movement of the punches. As bar $a$ descends the punches are forced through the cherries in the pockets under them, which forces the pits down through the shell of the cylinder and the punch-cleaner $y$, when they fall into trough R. During the downward movement of bar $a$ the pawl T is carried down to engage a serration below in wheel $v'$, and bar $r$ is carried down on the other side of studs $b$ $b$, Figs. 4 and 5, until the aperture $e''$ is reached, when said bar springs to the position shown in Fig 3 again, the studs $b$ $b$ passing through said aperture $e''$, ready to again throw out pawl $i$ as the bar $a$ rises during a continuation of the operation.

In trough R a device may be located in the form of a worm-screw or other suitable device, (not here shown,) for carrying the pits out of said trough.

The pitted fruit is deposited on the rear side of the cylinder by falling out of the pockets as the cylinder revolves.

Having thus described my invention, what I claim as new is—

1. The combination of the frame having the flanged disk, the revoluble cylinder having the notches and ratchet-wheel at one end, the other end having bearings in said disk, the cylinder-revolving pawl, the spring-metal locking-pawl provided with the studs, and the slotted spring-metal unlocking-bar, substantially as described and shown.

2. In a cherry-pitter, the combination of the frame, the revoluble shaft, punch-supporting bar, the pivoted arms connecting said shaft and bar, the revoluble cylinder having the notches and ratchet at one end, the flanged disk forming bearings to said cylinder at the other end, the slotted unlocking spring-bar, secured at its upper end to the punch-supporting bar, the spring locking-pawl having the studs, and the pawl for revolving the cylinder, all adapted to operate substantially as set forth.

3. The combination, with a revoluble cylinder provided with fruit-pockets having the beveled sides, of a fruit-spout located at the side of said cylinder, whereby the pockets act as scoops in filling them with fruit, substantially as described.

JOHN WILLIAMS.

Witnesses:
PHILIP SCHARE,
WILLIAM B. STROWGER.